United States Patent
Hu et al.

(10) Patent No.: US 11,173,891 B2
(45) Date of Patent: Nov. 16, 2021

(54) TORQUE DISTRIBUTION CONTROL TO IMPROVE STEERING PERFORMANCE IN THROUGH-THE-ROAD ELECTRIFIED VEHICLES

(71) Applicant: FCA US LLC, Auburn Hills, MI (US)

(72) Inventors: Jiamu Hu, Rochester Hills, MI (US); Konstantinos Siokos, Rochester Hills, MI (US); Sandeep Makam, Rochester Hills, MI (US); Lurun Zhong, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 275 days.

(21) Appl. No.: 16/417,086

(22) Filed: May 20, 2019

(65) Prior Publication Data

US 2020/0369257 A1 Nov. 26, 2020

(51) Int. Cl.
| | |
|---|---|
| B60W 20/10 | (2016.01) |
| B60W 10/06 | (2006.01) |
| B60W 10/08 | (2006.01) |
| B60W 10/20 | (2006.01) |
| B60W 30/02 | (2012.01) |

(Continued)

(52) U.S. Cl.
CPC ............ *B60W 20/10* (2013.01); *B60W 10/06* (2013.01); *B60W 10/08* (2013.01); *B60W 10/20* (2013.01); *B60W 30/02* (2013.01); *B60W 30/18145* (2013.01); *B60W 50/0097* (2013.01); *B60K 6/52* (2013.01); *B60W 2050/001* (2013.01); *B60W 2050/0011* (2013.01); *B60W 2050/0028* (2013.01); *B60W 2400/00* (2013.01); *B60W 2520/14* (2013.01); *B60W 2520/28* (2013.01); *B60W 2540/18* (2013.01); *B60W 2710/0666* (2013.01); *B60W 2710/083* (2013.01); *B60Y 2200/92* (2013.01); *B60Y 2400/82* (2013.01)

(58) Field of Classification Search
CPC .................................................... B60W 20/10
See application file for complete search history.

(56) References Cited

U.S. PATENT DOCUMENTS

| | | | | |
|---|---|---|---|---|
| 5,948,027 A | * | 9/1999 | Oliver, Jr. ......... | B60G 21/0555 701/37 |
| 6,691,013 B1 | | 2/2004 | Brown | |

(Continued)

OTHER PUBLICATIONS

International Search Report and Written Opinion dated Jul. 21, 2020 for International Application No. PCT/US2020/033350.

*Primary Examiner* — Michael A Berns
(74) *Attorney, Agent, or Firm* — Ralph E. Smith

(57) ABSTRACT

Torque distribution control systems and methods for through-the-road electrified vehicles having distinct first and second torque generating systems for distinct first and second axles, respectively, utilize existing vehicle sensors to (i) obtain measured wheel rotational speeds and a measured steering wheel angle, (ii) estimate virtual yaw rates of the first and second axles using these measured values and other known vehicle parameters, (ii) predict whether oversteer or understeer of the vehicle is likely to occur based on the estimated first and second axle virtual yaw rates, and (iv) when oversteer or understeer of the vehicle is predicted to occur, adjust a torque distribution between the first and second torque generating systems to prevent the oversteer or understeer from occurring and to keep the vehicle on a constant turn path.

18 Claims, 3 Drawing Sheets

(51) Int. Cl.
    *B60W 30/18*     (2012.01)
    *B60W 50/00*     (2006.01)
    *B60K 6/52*     (2007.10)

(56) References Cited

U.S. PATENT DOCUMENTS

| | | | |
|---|---|---|---|
| 6,704,627 B2 | 3/2004 | Tatara et al. | |
| 6,945,347 B2 | 9/2005 | Matsuno | |
| 7,059,991 B2 * | 6/2006 | Puiu | B60K 17/3462 |
| | | | 475/201 |
| 7,171,296 B2 * | 1/2007 | Kato | B60T 8/172 |
| | | | 701/70 |
| 7,386,379 B2 * | 6/2008 | Naik | B60K 17/356 |
| | | | 180/6.5 |
| 7,641,014 B2 * | 1/2010 | Hu | B60W 10/06 |
| | | | 180/197 |
| 7,909,126 B2 * | 3/2011 | Gaffney | B60T 8/1755 |
| | | | 180/197 |
| 7,966,113 B2 * | 6/2011 | Kroehnert | B60T 8/17555 |
| | | | 701/41 |
| 7,997,373 B2 * | 8/2011 | Yasui | B60W 30/045 |
| | | | 180/197 |
| 8,195,348 B2 | 6/2012 | Mizutani et al. | |
| 8,229,642 B2 | 7/2012 | Post et al. | |
| 8,504,238 B2 * | 8/2013 | Yu | B60W 30/045 |
| | | | 701/29.2 |
| 8,725,335 B2 | 5/2014 | Tolkacz et al. | |
| 8,935,037 B2 * | 1/2015 | Bechtler | B60T 8/885 |
| | | | 701/29.2 |
| 9,950,703 B2 * | 4/2018 | Lee | B60W 10/20 |
| 10,196,086 B2 * | 2/2019 | Gupta | B62D 5/0484 |
| 10,821,853 B2 * | 11/2020 | Healy | B60W 10/06 |
| 2006/0058935 A1 * | 3/2006 | Ghoneim | B62D 6/003 |
| | | | 701/41 |
| 2007/0021875 A1 | 1/2007 | Naik et al. | |
| 2007/0050112 A1 | 3/2007 | Kroehnert et al. | |
| 2011/0071727 A1 | 3/2011 | Bechtler et al. | |
| 2011/0257826 A1 | 10/2011 | Yu et al. | |
| 2014/0379220 A1 | 12/2014 | Lee et al. | |
| 2020/0255017 A1 * | 8/2020 | Siokos | B60W 10/119 |
| 2020/0369257 A1 * | 11/2020 | Hu | B60W 10/08 |

\* cited by examiner

TORQUE DISTRIBUTION CONTROL TO IMPROVE STEERING PERFORMANCE IN THROUGH-THE-ROAD ELECTRIFIED VEHICLES

FIELD

The present application generally relates to through-the-road electrified vehicles and, more particularly, to torque distribution control to improve steering performance in such vehicles.

BACKGROUND

Vehicles include a torque generating system (an internal combustion engine, an electric motor, or combinations thereof) that generates drive torque. This drive torque is typically transferred to a driveline (axles, wheels, etc.) of the vehicle via a transmission. During certain vehicle turn scenarios, oversteer or understeer occurs. For example, understeer is more prevalent in front-wheel drive powertrains whereas oversteer is more prevalent in rear-wheel drive powertrains. Conventional electronic stability control (ESC) systems operate to correct vehicle oversteer/understeer. This typically involves monitoring vehicle yaw rate sensors to detect vehicle oversteer/understeer and then reactively adjusting the powertrain torque distribution. Because these conventional ESC systems are reactive, however, they do not prevent the vehicle oversteer/understeer from initially occurring. These conventional ESC systems also do not improve steering performance during linear (normal) steering conditions. Accordingly, while such vehicle ESC systems do work well for their intended purpose, there remains a need for improvement in the relevant art.

SUMMARY

According to one example aspect of the invention, a torque distribution control system for improved steering performance in a through-the-road electrified vehicle having a powertrain comprising a first torque generating system connected to a first axle of the vehicle and a distinct second torque generating system connected to an independent second axle of the vehicle is presented. In one exemplary implementation, the torque distribution control system comprises: a set of wheel speed sensors configured to measure rotational speeds of first wheels of the vehicle that are connected to the first axle and second wheels of the vehicle that are connected to the second axle, a steering wheel angle sensor configured to measure an angle of a steering wheel of the vehicle, and a control system configured to: based on the measured wheel rotational speeds and the measured steering wheel angle, estimate virtual yaw rates of the first and second axles, based on the estimated first and second axle virtual yaw rates, predict whether oversteer or understeer of the vehicle is likely to occur, and when oversteer or understeer of the vehicle is predicted to occur, adjust a torque distribution between the first and second torque generating systems to prevent the oversteer or understeer from occurring and to keep the vehicle on a constant turn path.

In some implementations, the control system is further configured to estimate the first and second axle virtual yaw rates by: calculating differences (i) between the measured first wheel speeds and (ii) between the measured second wheel speeds, determining front and rear axle turn radii based on the measured steering wheel angle and a known wheelbase length of the vehicle, and estimating the first and second axle virtual yaw rates based on at least the respective measured first and second wheel speed differences and the respective front and rear axle turn radii. In some implementations, the control system is configured to adjust the torque distribution between the first and second torque generating systems using a difference between the first and second axle virtual yaw rates as feedback in a feedback control loop. In some implementations, the feedback control loop is a proportional-integral (PI) or proportional-integral-derivative (PID) feedback control loop with a zero or substantially zero difference between the first and second axle virtual yaw rates as a target value.

In some implementations, the control system is configured to adjust the torque distribution between the first and second torque generating systems using a model predictive control scheme configured to predict upcoming turn events. In some implementations, the torque distribution control system further comprises an electronic stability control (ESC) system configured to operate in parallel with the control system and further configured to: detect, using one or more yaw rate sensors of the vehicle, an oversteer or understeer condition of the vehicle, and in response to detecting the oversteer or understeer condition, adjust torque distribution in the powertrain to mitigate or eliminate the oversteer or understeer condition. In some implementations, the control system does not utilize the one or more yaw rate sensors of the vehicle. In some implementations, the first torque generating system comprises an engine connected to a transmission connected to the first axle and the second torque generating system comprises a first electric motor connected to the second axle. In some implementations, the first torque generating system further comprises a second electric motor connected to the engine.

According to another example aspect of the invention, a torque distribution control method for improved steering performance in a through-the-road electrified vehicle having a powertrain comprising a first torque generating system connected to a first axle of the vehicle and a distinct second torque generating system connected to a second axle of the vehicle is presented. In one exemplary implementation, the torque distribution control method comprises: receiving, by a control system of the vehicle and from a set of wheel speed sensors of the vehicle, measured rotational speeds of first wheels of the vehicle that are connected to the first axle and second wheels of the vehicle that are connected to the second axle, receiving, by the control system and from a steering wheel angle sensor of the vehicle, a measured angle of a steering wheel of the vehicle, estimating, by the control system, virtual yaw rates of the first and second axles based on the measured wheel rotational speeds and the measured steering wheel angle, predicting, by the control system, whether oversteer or understeer of the vehicle is likely to occur based on the estimated front and rear axle virtual yaw rates, and when oversteer or understeer of the vehicle is predicted to occur, adjusting, by the control system, a torque distribution between the first and second torque generating systems to prevent the oversteer or understeer from occurring and to keep the vehicle on a constant turn path.

In some implementations, the torque distribution control method further comprises estimating the first and second axle virtual yaw rates by: calculating, by the control system, differences (i) between the measured first wheel speeds and (ii) between the measured second wheel speeds, determining, by the control system, first and second axle turn radii based on the measured steering wheel angle and a known wheelbase length of the vehicle, and estimating, by the control system, the front and rear axle virtual yaw rates based on at least the respective measured first and second wheel speed differences and the respective front and rear axle turn radii. In some implementations, adjusting the torque distribution between the first and second torque generating systems comprises using a difference between the first and second axle virtual yaw rates as feedback in a feedback control loop. In some implementations, the feedback control loop is a PI or PID feedback control loop with a zero or substantially zero difference between the first and second axle virtual yaw rates as a target value.

In some implementations, adjusting the torque distribution between the first and second torque generating systems comprises using a model predictive control scheme configured to predict upcoming turn events. In some implementations, the torque distribution control method further comprises operating, by an electronic stability control (ESC) system of the vehicle, in parallel with the control system, further comprising detecting, by the ESC system and using one or more yaw rate sensors of the vehicle, an oversteer or understeer condition of the vehicle, and in response to detecting the oversteer or understeer condition, adjusting, by the ESC system, torque distribution in the powertrain to mitigate or eliminate the oversteer or understeer condition. In some implementations, the control system does not utilize the one or more yaw rate sensors of the vehicle. In some implementations, the first torque generating system comprises an engine connected to a transmission connected to the first axle and the second torque generating system comprises a first electric motor connected to the second axle. In some implementations, the first torque generating system further comprises a second electric motor connected to the engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, conventional electronic stability control (ESC) systems are reactive in that they adjust powertrain torque distribution in response to detected oversteer/understeer conditions based on measurements from vehicle yaw rate sensors. These conventional ESC systems also do not improve steering performance during linear (normal) steering conditions (e.g., wheel side slip angle <3%), which are different than non-linear (oversteer/understeer) steering conditions. For example only, during a constant vehicle speed turn scenario around a curved road, the radius of the curve could be decreasing, which could result in the driver oversteering during the turn in an attempt to follow the road's curvature. In through-the-road electrified vehicles, also known as electrically all-wheel drive (eAWD) vehicles, the front and rear axles have distinct torque generating systems associated therewith. For example, a first axle could have an engine, an optional first electric motor (e.g., for starting the engine), and a transmission connected thereto, whereas a second axle could have a second electric motor connected thereto. Accordingly, techniques for torque distribution control to improve steering performance in through-the-road electrified vehicles are presented.

These techniques operate proactively to attempt to prevent or avoid vehicle understeer or oversteer. These techniques also operate during linear steering conditions whereas conventional ESC systems only adjust torque distribution to correct oversteer/understeer detected using vehicle yaw rate sensors. The techniques of the present disclosure utilize existing wheel speed and steering wheel angle sensors to estimate wheel speed differentials and virtual yaw rates for the front and rear axles. Based on these estimated virtual yaw rates, the techniques adjust front/rear axle torque distribution (e.g., using a proportional-integral (PI), proportional-integral-derivative (PID), or other suitable feedback control loop, or using a model predictive control scheme) such that the front/rear axle virtual yaw rates remain the same or approximately the same, thereby preventing oversteer/understeer of the vehicle and keeping the vehicle traveling along a desired path. The independent torque control of the two axles through the two propulsion devices/systems provides significant advantages over conventional mechanical AWD systems and allows such torque distribution control to effectively reduce oversteer/understeer propensity. If the steering condition becomes non-linear (i.e., oversteer or understeer begins to occur), an ESC system operating in parallel will take over and further adjust torque distribution to mitigate or eliminate the oversteer/understeer.

Figure 1:
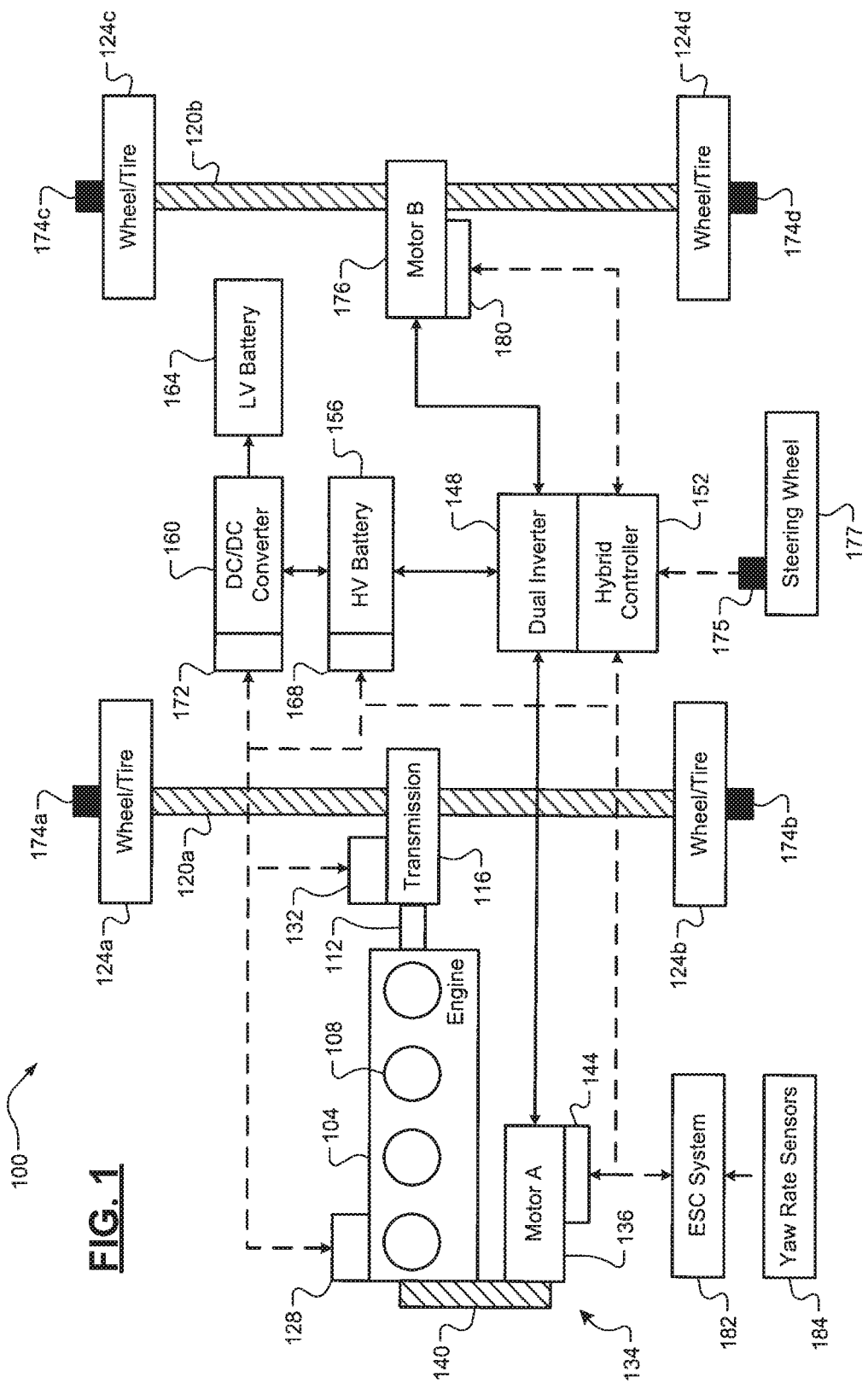
FIG. 1 illustrates a schematic diagram of an example through-the-road electrified vehicle according to the principles of the present disclosure.

Referring now to FIG. 1, an exemplary configuration of a through-the-road electrified vehicle 100 is illustrated. It will be appreciated that this is merely one example vehicle configuration and the techniques of the present disclosure could be applicable to any through-the-road or eAWD powertrain having independent torque generating systems associated with independent axles (hybrid with engine/optional motor A at first axle and motor B at second axle, all-electric with motor A at first axle and motor B at second axle, etc.). The vehicle 100 includes an internal combustion engine 104 that is configured to combust a mixture of air and fuel within cylinders 108 to drive pistons (not shown) that generate drive torque at a crankshaft 112. While only four cylinders are shown, it will be appreciated that the engine 104 could include any suitable number of cylinders. The drive torque at the crankshaft 112 is transferred by a transmission 116 to a front axle 120a of the vehicle 100. The front axle 120a is in turn connected to front wheels/tires 124a, 124b. The engine 104 is controlled by a respective control unit/module 128, and the transmission 116 is controlled by a respective control unit/module 132.

The engine 104 also includes an optional belt-driven starter generator (BSG) unit 134 including an electric motor 136 ("Motor A") and a drive device 140 (e.g., a belt or chain) that couples the electric motor 136 to the crankshaft 112. The electric motor 136 is capable of acting both as a torque provider by providing torque to the crankshaft 112 (e.g., to start the engine 104) and a torque consumer by converting a portion of the drive torque at the crankshaft 112 into electrical energy. The BSG unit 134 is capable of quickly starting the engine 104, such as in response to an electric-only to parallel mode transition being initiated. The BSG unit 134 could also be utilized to quickly increase the torque output at the front axle 120a as described in greater detail later on. The electric motor 136 is controlled by a respective control unit/module 144. The electric motor 136 either receives electrical energy from or provides electrical energy to a dual inverter 148. The dual inverter 148 is controlled by a respective hybrid controller 152. The engine 104, transmission 116, and optional electric motor 136 are also referred to herein as a "first torque generating system."

This hybrid controller 152 also communicates with the other control modules/units such that the vehicle 100 generates a desired drive torque, e.g., based on a driver torque request. The dual inverter 148 is also connected to a high voltage (HV) battery 156. The dual inverter 148 converts alternating current (AC) (to/from the electric motor 136) into direct current (DC) (to/from the HV battery 156 and vice-versa. The HV battery 156 is connected to a DC-DC converter 160, which steps-down a voltage of the HV battery 156 to recharge a low voltage (LV) battery (e.g., a 12 volt lead-acid battery). The HV battery is controlled by a respective control unit/module 168 and the DC-DC converter 160 is controlled by a respective control unit/module 172, both of which are also in communication with the hybrid controller 152. The hybrid controller 152 also receives measurements from other sensors, including at least front and rear wheel speed sensors 174a-174d (collectively, "wheel speed sensors 174") and a steering wheel angle sensor 175 that measures an angle of a steering wheel 177. An ESC system 182 operates in a conventional manner and in parallel with the techniques of the present disclosure to mitigate/eliminate detected understeer/oversteer based on measurements from yaw rate sensor(s) 184.

It will be appreciated that the hybrid controller 152 could also receive measurements from other non-illustrated sensors, such as, but not limited to, a vehicle speed sensor, one or more yaw rate sensors, and a lateral acceleration sensor. The vehicle 100 further includes another electric motor 176 ("Motor B"). This electric motor 176 is also referred to as a traction motor because it provides drive torque to an independent rear axle 120b, which is in turn connected to rear wheels/tires 124c, 124d. It will be appreciated that the term "axle" as used herein includes a solid axle, half shafts, or any other suitable axle configuration. It will also be appreciated that the front and rear axles 120a, 120b could have the same axle configuration or different axle configurations. The electric motor 176 receives electrical energy (AC) from the dual inverter 148 in order to generate this drive torque. The electric motor 176 is controlled by a respective control module/unit 180, which is also in communication with the hybrid controller 152. The electric motor 176 is also referred to herein as a "second torque generating system." It will be appreciated that these various controllers and control units/modules 128, 132, 152, 168, 172, 180 are collectively referred to herein as "a control system."

Figure 2:
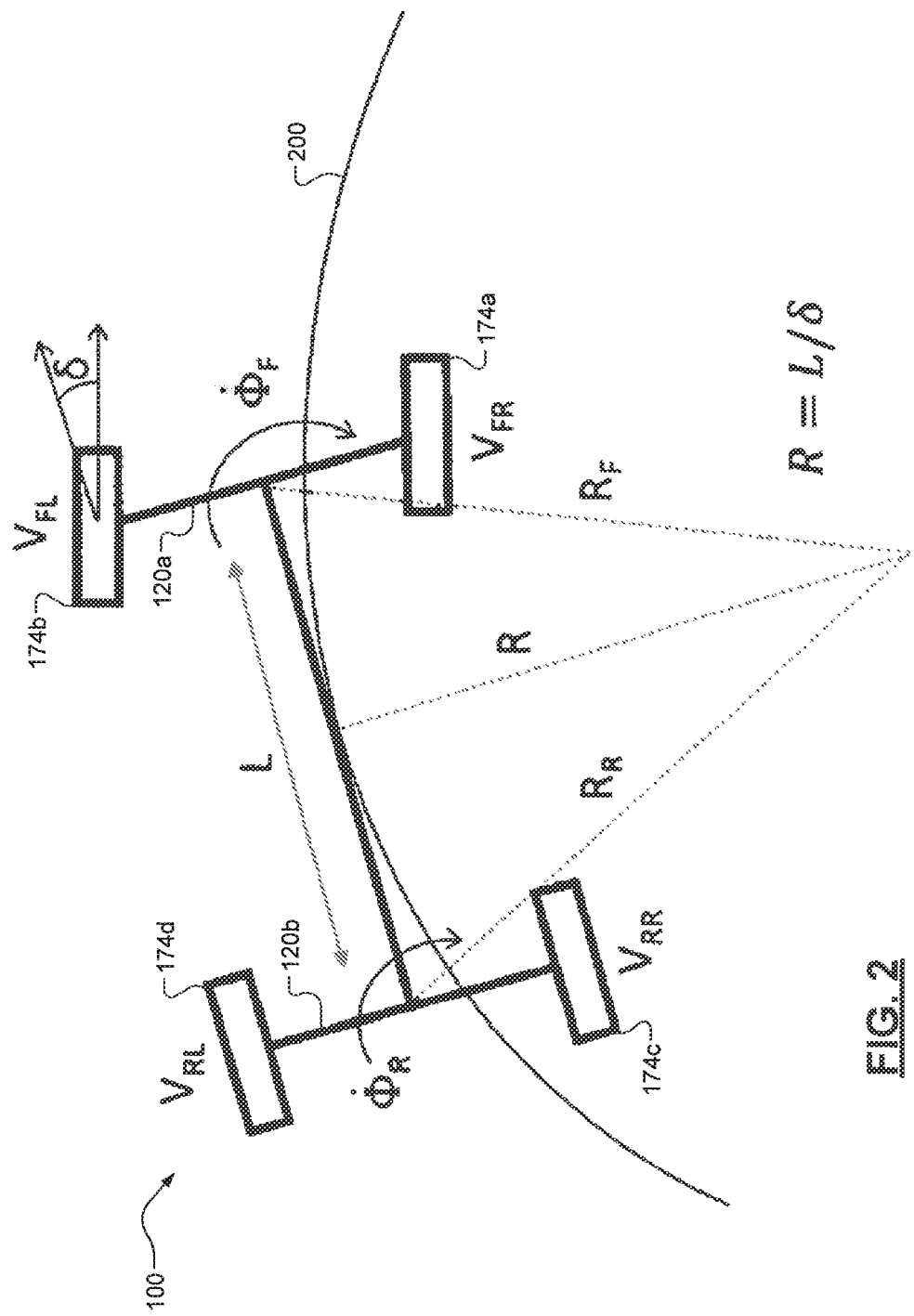
FIG. 2. illustrates a diagram of an example through-the-road electrified vehicle during a turn scenario according to the principles of the present disclosure.

Referring now to FIG. 2, an example diagram of the through-the-road electrified vehicle 100 during an example turn scenario is illustrated. As shown, the vehicle 100 is attempting to turn and travel along desired path 200. First, the measured wheel speeds ($V_{FL}$, $V_{FR}$, $V_{RR}$, $V_{RL}$) from sensors 174a-174d, respectively, and the measured steering wheel angle ($\delta$) from sensor 175 are obtained. Next, front and rear axle turn radii ($R_F$, $R_R$, respectively) are determined based on a known wheelbase length (L) of the vehicle 100 and the measured steering wheel angle $\delta$. Specifically, a ratio (L/$\delta$) of the wheelbase length L to the measured steering wheel angle $\delta$ represents a turn radii to a center of the vehicle 100. Because the wheelbase length L is known, the front and rear axle turn radii $R_F$, $R_R$ can then be determined. Lastly, the virtual front and rear axle virtual yaw rates ($\dot{\phi}_F$ and $\dot{\phi}_R$, respectively) are estimated by taking into account the respective front and rear wheel speed differences and the respective front and rear axle turn radii, and potentially other parameters.

The primary goal is for these estimated front and rear axle virtual yaw rates to be the same or their difference to be substantially zero (i.e., within a calibratable threshold amount from zero). A front/rear axle torque distribution setpoint is then used to control the first and second torque generating systems, and the process can continue to estimate the front and rear axle virtual yaw rates and adjust the control setpoint as long as the vehicle 100 remains in the linear steering range (e.g., less than 3% wheel side slip angle, with any greater values being indicative of oversteer or understeer that will instead be detected and handled by the ESC system 182). This process allows for the front/rear torque distribution to help keep the vehicle 100 traveling along desired path 200 without experiencing oversteer/understeer (non-linear) steering conditions. As an alternative to this feedback based torque distribution control, a model predictive control scheme could be employed. For example only, using vehicle autonomous driving systems/sensors (e.g., a front-facing camera system), upcoming turn events could be predicted and an adjustment to the front/rear axle torque distribution could be anticipated and proactively controlled.

Figure 3:
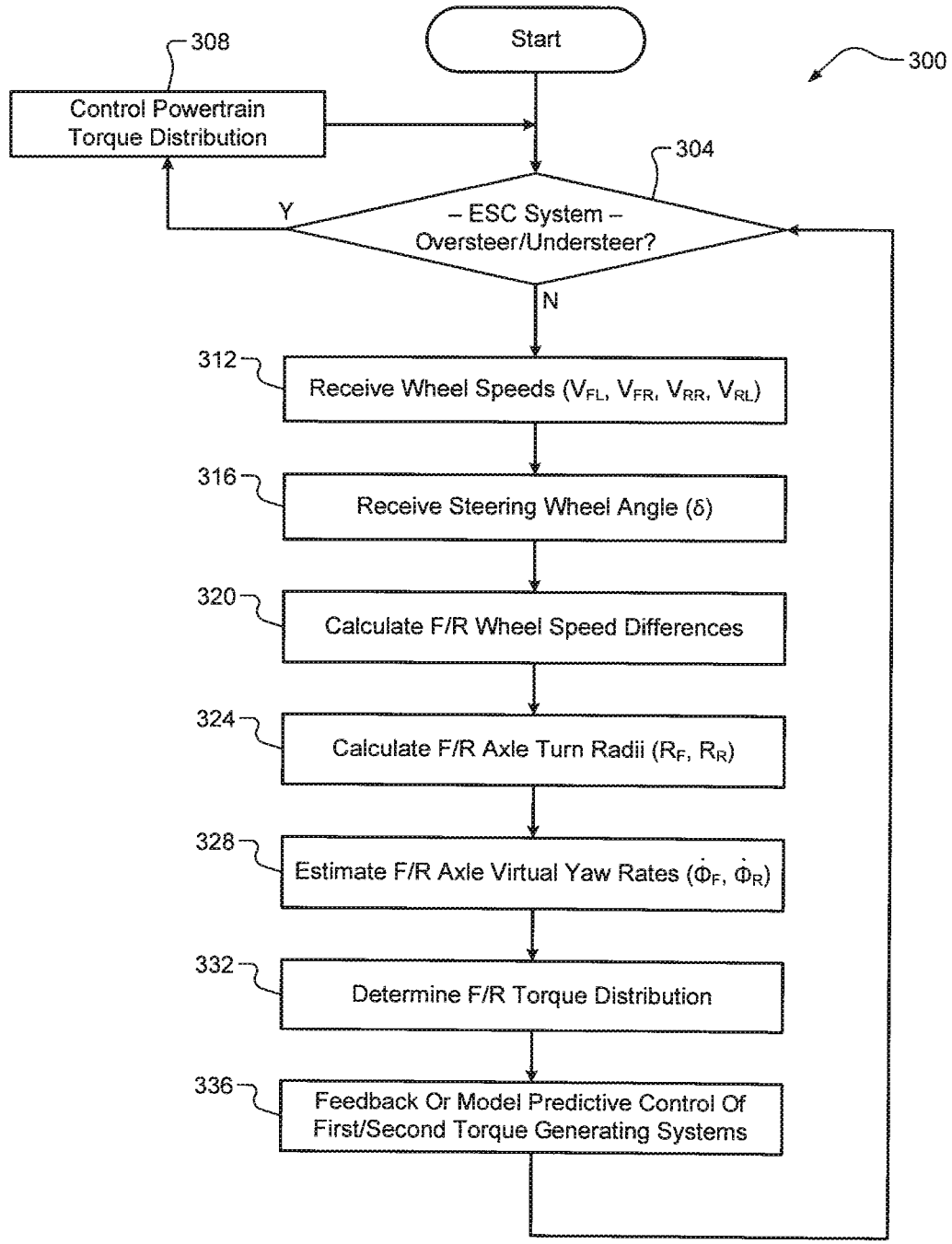
FIG. 3 illustrates a flow diagram of an example torque distribution control method to improve steering performance in a through-the-road electrified vehicle according to the principles of the present disclosure.

Referring now to FIG. 3, a flow diagram of an example torque distribution control method 300 for improved steering performance in a through-the-road electrified vehicle is illustrated. For purposes of the present disclosure, the method 300 will reference vehicle 100 and its components, but it will be appreciated that the method 300 could be applicable to any suitable through-the-road electrified vehicle. At 304, the ESC system 182 determines whether oversteer/understeer of the vehicle 100 (e.g., based on measurements from yaw rate sensor(s) 184) is detected. When true, the method 300 proceeds to 308 where in the parallel ESC routine the ESC system 182 attempts to correct the oversteer/understeer by controlling powertrain torque distribution in a conventional manner and the method 300 then ends or returns to 304 for one or more additional cycles. Otherwise, the method 300 proceeds to 312 where the torque distribution control techniques of the present disclosure are performed (e.g., by the other control modules/units/systems described herein, also collectively referred to as a "control system" that is separate from the ESC system 182 for purposes of the present disclosure).

At 312, the control system receives measurements from the wheel speed sensors 174. At 316, the control system receives measurements from the steering wheel angle sensor 175. At 320, the control system calculates (i) a difference between the measured front wheel speeds and (ii) a difference between the rear wheel speeds. At 324, the control system determines front and rear axle turn radii based on the measured steering wheel angle and a known wheelbase length of the vehicle 100. At 328, the control system estimates the front and rear axle virtual yaw rates based on these values. At 332, the control system determines a front/rear axle torque distribution or setpoint so as to maintain the front/rear axle estimated virtual yaw rates equal or substantially equal to prevent oversteer/understeer and to keep the vehicle 100 moving along a desired path. At 336, the control system commands the first and second torque generating systems (e.g., engine 104 and electric motor 176) according to the determined front/rear axle torque distribution (e.g., using a PI, PID, or other suitable feedback control loop, or using a model predictive control scheme). The method 300 then ends or returns to 304 for one or more additional cycles.

As previously mentioned herein, it will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A torque distribution control system for improved steering performance in a through-the-road electrified vehicle having a powertrain comprising a first torque generating system connected to a first axle of the vehicle and a distinct second torque generating system connected to an independent second axle of the vehicle, the torque distribution control system comprising:
    a set of wheel speed sensors configured to measure rotational speeds of first wheels of the vehicle that are connected to the first axle and second wheels of the vehicle that are connected to the second axle;
    a steering wheel angle sensor configured to measure an angle of a steering wheel of the vehicle; and
    a control system configured to:
        based on the measured wheel rotational speeds and the measured steering wheel angle, estimate virtual yaw rates of the first and second axles;
        based on the estimated first and second axle virtual yaw rates, predict whether oversteer or understeer of the vehicle is likely to occur; and
        when the oversteer or understeer of the vehicle is predicted to occur, adjust a torque distribution between the first and second torque generating systems to prevent the oversteer or understeer from occurring and to keep the vehicle on a constant turn path.

2. The torque distribution control system of claim 1, wherein the control system is further configured to estimate the first and second axle virtual yaw rates by:
    calculating differences (i) between the measured first wheel rotational speeds and (ii) between the measured second wheel rotational speeds;
    determining front and rear axle turn radii based on the measured steering wheel angle and a known wheelbase length of the vehicle; and
    estimating the first and second axle virtual yaw rates based on at least the respective measured first and second wheel speed differences and the respective front and rear axle turn radii.

3. The torque distribution control system of claim 2, wherein the control system is configured to adjust the torque distribution between the first and second torque generating systems using a difference between the first and second axle virtual yaw rates as feedback in a feedback control loop.

4. The torque distribution control system of claim 3, wherein the feedback control loop is a proportional-integral (PI) or proportional-integral-derivative (PID) feedback control loop with a zero or substantially zero difference between the first and second axle virtual yaw rates as a target value.

5. The torque distribution control system of claim 1, wherein the control system is configured to adjust the torque distribution between the first and second torque generating systems using a model predictive control scheme configured to predict upcoming turn events.

6. The torque distribution control system of claim 1, further comprising an electronic stability control (ESC) system configured to operate in parallel with the control system and further configured to:
    detect, using one or more yaw rate sensors of the vehicle, an oversteer or understeer condition of the vehicle; and
    in response to detecting the oversteer or understeer condition, adjust torque distribution in the powertrain to mitigate or eliminate the oversteer or understeer condition.

7. The torque distribution control system of claim 6, wherein the control system does not utilize the one or more yaw rate sensors of the vehicle.

8. The torque distribution control system of claim 1, wherein the first torque generating system comprises an engine connected to a transmission connected to the first axle and the second torque generating system comprises a first electric motor connected to the second axle.

9. The torque generating control system of claim 8, wherein the first torque generating system further comprises a second electric motor connected to the engine.

10. A torque distribution control method for improved steering performance in a through-the-road electrified vehicle having a powertrain comprising a first torque generating system connected to a first axle of the vehicle and a distinct second torque generating system connected to a second axle of the vehicle, the torque distribution control method comprising:
    receiving, by a control system of the vehicle and from a set of wheel speed sensors of the vehicle, measured rotational speeds of first wheels of the vehicle that are connected to the first axle and second wheels of the vehicle that are connected to the second axle;
    receiving, by the control system and from a steering wheel angle sensor of the vehicle, a measured angle of a steering wheel of the vehicle;
    estimating, by the control system, virtual yaw rates of the first and second axles based on the measured wheel rotational speeds and the measured steering wheel angle;
    predicting, by the control system, whether oversteer or understeer of the vehicle is likely to occur based on the estimated front and rear axle virtual yaw rates; and
    when the oversteer or understeer of the vehicle is predicted to occur, adjusting, by the control system, a torque distribution between the first and second torque generating systems to prevent the oversteer or understeer from occurring and to keep the vehicle on a constant turn path.

11. The torque distribution control method of claim 10, further comprising estimating the first and second axle virtual yaw rates by:
   calculating, by the control system, differences (i) between the measured first wheel rotational speeds and (ii) between the measured second wheel rotational speeds;
   determining, by the control system, first and second axle turn radii based on the measured steering wheel angle and a known wheelbase length of the vehicle; and
   estimating, by the control system, the front and rear axle virtual yaw rates based on at least the respective measured first and second wheel speed differences and the respective front and rear axle turn radii.

12. The torque distribution control method of claim 11, wherein adjusting the torque distribution between the first and second torque generating systems comprises using a difference between the first and second axle virtual yaw rates as feedback in a feedback control loop.

13. The torque distribution control method of claim 12, wherein the feedback control loop is a proportional-integral (PI) or proportional-integral-derivative (PID) feedback control loop with a zero or substantially zero difference between the first and second axle virtual yaw rates as a target value.

14. The torque distribution control method of claim 10, wherein adjusting the torque distribution between the first and second torque generating systems comprises using a model predictive control scheme configured to predict upcoming turn events.

15. The torque distribution control method of claim 10, further comprising operating, by an electronic stability control (ESC) system of the vehicle, in parallel with the control system and further comprising:
   detecting, by the ESC system and using one or more yaw rate sensors of the vehicle, an oversteer or understeer condition of the vehicle; and
   in response to detecting the oversteer or understeer condition, adjusting, by the ESC system, torque distribution in the powertrain to mitigate or eliminate the oversteer or understeer condition.

16. The torque distribution control method of claim 15, wherein the control system does not utilize the one or more yaw rate sensors of the vehicle.

17. The torque distribution control method of claim 10, wherein the first torque generating system comprises an engine connected to a transmission connected to the first axle and the second torque generating system comprises a first electric motor connected to the second axle.

18. The torque generating control method of claim 17, wherein the first torque generating system further comprises a second electric motor connected to the engine.

* * * * *